(12) United States Patent
Nishio et al.

(10) Patent No.: US 7,324,494 B2
(45) Date of Patent: Jan. 29, 2008

(54) RECEPTION DEVICE AND RECEPTION METHOD

(75) Inventors: Akihiko Nishio, Yokosuka (JP); Hideyuki Takahashi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 525 days.

(21) Appl. No.: 10/515,111

(22) PCT Filed: May 19, 2003

(86) PCT No.: PCT/JP03/06174

§ 371 (c)(1), (2), (4) Date: Nov. 19, 2004

(87) PCT Pub. No.: WO04/002000

PCT Pub. Date: Dec. 31, 2003

(65) Prior Publication Data

US 2005/0243901 A1 Nov. 3, 2005

(30) Foreign Application Priority Data

May 22, 2002 (JP) .............................. 2002-148275

(51) Int. Cl.
*H04B 7/216* (2006.01)
*H04B 1/00* (2006.01)

(52) U.S. Cl. ...................... 370/342; 370/335; 375/145; 375/149

(58) Field of Classification Search ................ 370/329, 370/342
See application file for complete search history.

(56) References Cited

U.S. PATENT DOCUMENTS 5,737,323 A 4/1998 Lansdowne 6,173,016 B1 1/2001 Suzuki
6,775,260 B1 * 8/2004 Dabak et al. ............... 370/342
6,778,592 B1 8/2004 Haga et al.

(Continued)

FOREIGN PATENT DOCUMENTS

JP 8251656 9/1996

(Continued)

OTHER PUBLICATIONS

3GPP TS 25.221 V4.4.0 (Mar. 2002).

(Continued)

*Primary Examiner*—Lester G. Kincaid
*Assistant Examiner*—Matthew C Sams
(74) *Attorney, Agent, or Firm*—Stevens, Davis, Miller & Mosher, LLP

(57) ABSTRACT

A spreading code determining section (107) determines which spreading code is multiplexed in a received signal that has been received by an antenna (101) and has gone through a radio receiver (102), a correlation processing section (103), a delay profile generator (104), a midamble shift determining section (105), and a path selector (106). When determining that it is during DTX, from the output of the spreading code determining section (107), a DTX determining section (110) reports this to the radio receiver (102), the path selector (106), a JD operation section (108), and a despreading/RAKE-combination section (109) to make them stop processing. Thus, despreading, RAKE combination, and JD demodulation of the received signal are suspended during DTX, so that power consumption can be suppressed.

4 Claims, 4 Drawing Sheets

U.S. PATENT DOCUMENTS

| | | | |
|---|---|---|---|
| 6,967,970 B2* | 11/2005 | Terry et al. | 370/458 |
| 7,082,108 B2* | 7/2006 | Hwang et al. | 370/311 |
| 2001/0024426 A1* | 9/2001 | Zeira et al. | 370/329 |
| 2004/0259517 A1* | 12/2004 | Takahashi et al. | 455/295 |

FOREIGN PATENT DOCUMENTS

| | | |
|---|---|---|
| JP | 1066152 | 3/1998 |
| JP | 11177524 | 7/1999 |
| JP | 2000261412 | 9/2000 |
| JP | 200177723 | 3/2001 |
| JP | 2001156625 | 6/2001 |

OTHER PUBLICATIONS

3GPP TS 25.224 V4.4.0 (Mar. 2002).

H.R. Karimi: "Efficient Multi-Rate Multi-User Detection For The Asynchronous WCDMA Uplink," 1999 IEEE, VTC '99, pp. 593-597.

* cited by examiner

RECEPTION DEVICE AND RECEPTION METHOD

TECHNICAL FIELD

The present invention relates to a receiving apparatus and receiving method using a CDMA scheme.

BACKGROUND ART

In IMT2000-TDD (International Mobile Telecommunications 2000—Time Division Duplex) system, a midamble which is a pilot series is inserted in the center of a time slot of a communicated signal as shown in FIG. 1A and FIG. 1B. In this system, one time slot is the data modulation unit. Moreover, data is not necessarily transmitted in the next time slot, therefore a burst transmission is performed.

A midamble to be inserted into the center of the time slot is generated by cycling a reference code (basic midamble code) by a predetermined number of chips on transmitting side, and plural kinds of midambles are generated.

A method of generating midambles will be explained with reference to FIG. 2. Midamble 1001-1 to midamble 1001-8 each have a length of 144 chips, and these midambles for 8 users (8 kinds of midambles) are generated by cyclic-shifts by 16 chips in the range where two basic midambles 1002 that are each a known series consisting of 128 chips are combined. These midambles are sometimes called midamble shifts. One of the 8 kinds of midamble shifts is assigned to each user signal and transmitted.

As a method of assigning midamble shifts to users, there are three schemes: "default midamble assigning scheme" in which the relationships between used spreading codes and midamble codes are decided beforehand; "user specific midamble assigning scheme," in which each user is assigned an individual midamble code; and "common midamble assigning scheme," in which all users are assigned a common midamble code. FIG. 1A shows the slot structure of a transmit signal in the default midamble assigning scheme. FIG. 1B shows the slot structure of a transmit signal in the common midamble assigning scheme.

The receiving side, when calculating a midamble correlation, performs a correlation calculation by cyclically shifting the basic midamble code each time by 16 chips, to generate delay profiles corresponding respectively to the midamble 1001-1 to midamble 1001-8 based on the calculation results. Then some paths are selected based on the generated delay profiles, and RAKE combination is performed on the selected paths. A JD (Joint Detection) operation is performed using a result of the RAKE combination and the delay profiles.

In case the transmitting side performs discontinuous transmission (DTX), the data transmission is suspended if data to be transmitted runs out during transmission.

However, with conventional apparatuses, there is the problem that, when the common midamble assigning scheme is used on the receiving apparatus side, the apparatus can not determine if data is being transmitted to the apparatus by observing the midamble. At this time, power is wasted in processing such as despreading, RAKE combination, and JD operation. There is also the following problem. That is, if the apparatus executes averaging the delay profiles over time in path-search even though no signal is sent to the apparatus, the accuracy in estimating path position degrades. Moreover, the gain of an AGC (Auto Gain Control) is set at a meaningless value.

DISCLOSURE OF THE INVENTION

An object of the present invention is to determine, during DTX, that it is a transmission suspended period and to suspend despreading, RAKE combination, and JD demodulation in order to suppress power consumption.

This object is achieved by the following receiving apparatus. In the default midamble assigning scheme or the common midamble assigning scheme, the receiving apparatus determines whether it is in a discontinuous receiving state by determining whether a spreading code or midamble assigned to the receiving apparatus exists among the spreading codes or midambles contained in the received signal. When determining that it is in the discontinuous receiving state, the receiving apparatus suspends despreading, RAKE combination, and JD demodulation.

BEST MODE FOR CARRYING OUT THE INVENTION

Embodiments of the present invention will be described in detail below with reference to the accompanying drawings.

EMBODIMENT 1

Figure 3:
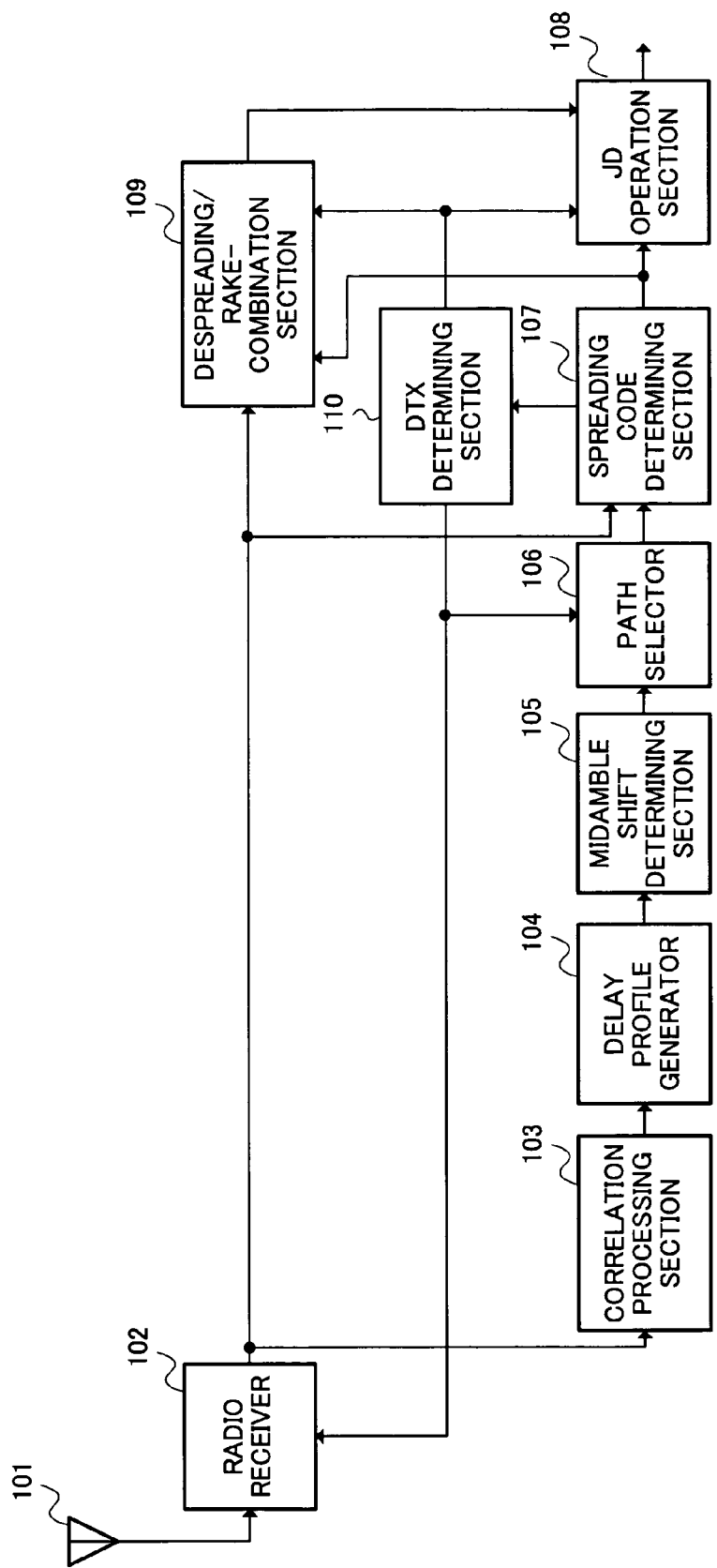
FIG. 3 is a block diagram showing an example of the configuration of a receiving apparatus according to embodiment 1 of the present invention.

FIG. 3 is a block diagram showing an example of the configuration of a receiving apparatus according to embodiment 1 of the present invention. Here, a case will be explained as an example where the common midamble assigning scheme is used as the method of generating midambles.

The receiving apparatus shown in FIG. 3 has an antenna 101, a radio receiver 102, a correlation processing section 103, a delay profile generator 104, a midamble shift determining section 105, a path selector 106, a spreading code determining section 107, a JD operation section 108, a despreading/RAKE-combination section 109, and a DTX determining section 110.

The radio receiver 102 performs predetermined radio processing including down-conversion on a signal received by the antenna 101. The correlation processing section 103 performs a correlation calculation between the received signal output from the radio receiver 102 and a midamble series known to the receiving side. The delay profile generator 104 divides the correlation calculation results corresponding to the respective midambles to create the delay profiles of the respective midamble shifts. The midamble shift determining section 105 determines which midamble shift is actually multiplexed, by using the peak powers of the delay profiles for the midamble shifts generated by the delay profile generator 104. The path selector 106 selects some peaks above a predetermined threshold value as the path by using the delay profile output from the midamble shift determining section 105. The spreading code determining section 107 determines which spreading code is multiplexed in the received signal. The despreading/RAKE-combination section 109 performs despreading and RAKE combination on the received signal output from the radio receiver 102 based on the selected spreading code and path information output from the spreading code determining section 107. The JD operation section 108 performs JD demodulation based on the output of RAKE combination in the despreading/RAKE-combination section 109 and the delay profiles generated by the delay profile generator 104. The DTX determining section 110 determines whether it is a transmission suspended period of DTX based on the output of the midamble shift determining section 105.

Next, the operation of the receiving apparatus having the above configuration will be described.

The radio receiver 102 performs predetermined radio processing including down-conversion from RF, AFC, AGC, and A/D conversion on the signal received by the antenna 101, converts it into a base band signal, and outputs the base band signal to the correlation processing section 103, the spreading code determining section 107, and the despreading/RAKE-combination section 109.

The correlation processing section 103 performs a correlation calculation between a pilot series called midamble contained in the received signal output from the radio receiver 102 and a midamble series known to the receiving side, and outputs the result to the delay profile generator 104.

The delay profile generator 104 divides the correlation calculation results output from the correlation processing section 103 and generates the delay profiles for the respective midamble shifts. The delay profiles for the respective midamble shifts are output to the midamble shift determining section 105.

The midamble shift determining section 105 detects a peak at which the power value is maximal from among the plurality of delay profiles corresponding to the respective midamble shifts output from the delay profile generator 104, and determines that the midamble shift corresponding to the delay profile having this maximum peak is the midamble shift actually used upon transmission. The determination result is output to the spreading code determining section 107.

The path selector 106 selects some peaks above a predetermined threshold value as paths by using the delay profile corresponding to the midamble shift determined to have been actually used by the midamble shift determining section 105. Then the selected paths are output to the spreading code determining section 107. This path selection is performed by way of threshold determination, in which the threshold value is set at the value of the maximum path in the delay profile minus $X_{Psel}$ [dB]. Then, in order to improve the accuracy in estimating path position, the delay profile for a previous frame or the averaged delay profile may be used. Moreover, any method such as a method of setting a threshold value for each user by multiplying the peak power by a predetermined constant, and a method of setting the threshold value at a value obtained by multiplying a noise level by a constant are applicable.

The spreading code determining section 107 performs despreading (or additional RAKE combination) of several symbols with known spreading codes based on information output from the midamble shift determining section 105, and determines which spreading code is multiplexed in the transmitted signal by determination with the threshold value on the despreading result. Here, the receiving apparatus is reported beforehand not only the spreading code to be used by the apparatus but also all spreading codes that may be used by other apparatuses. Then, the spreading code determining section 107 performs the determination for all the spreading codes in order to confirm, for each possible spreading code, whether it is multiplexed in the received signal. The reason the determination is also performed for the spreading codes used by other apparatuses is that the determination results are to be used by the JD operation section 108 when performing JD demodulation. Then spreading codes determined to be multiplexed therein are output to the JD operation section 108, the despreading/RAKE-combination section 109, and the DTX determining section 110.

The DTX determining section 110 determines that it is not DTX when the spreading code assigned to the receiving apparatus exists in the spreading codes output from the spreading code determining section 107, and that it is DTX when the spreading code assigned to the receiving apparatus does not exist.

When it is determined that it is DTX, the DTX determining section 110 reports this to the radio receiver 102, the path selector 106, the despreading/RAKE-combination section 109, and the JD operation section 108.

The radio receiver 102, reported DTX, holds the gain of the AGC at a value before DTX. By this means, the gain can be prevented from being set at a meaningless value, thus improving receiving performance.

The path selector 106, reported DTX, makes present delay profile not contained in an averaging-over-time period for delay profiles (In path-search, the delay profiles are averaged over time to detect path position). By this means, the accuracy in estimating path position can be prevented from degrading due to averaging the delay profiles over time in path-search when there is no signal sent to this receiving apparatus.

The despreading/RAKE-combination section 109, reported DTX, suspends despreading and RAKE combination. The JD operation section 108, reported DTX, suspends JD demodulation. By this means, power consumption in the despreading/RAKE-combination section 109 and the JD operation section 108 can be reduced.

When it is determined that it is not DTX, the following processing is performed.

The despreading/RAKE-combination section 109 performs despreading and RAKE combination on the received signal output from the radio receiver 102 based on the spreading code output from the spreading code determining section 107, and outputs the result to the JD operation section 108.

The JD operation section 108 performs JD demodulation over one time slot on the received signal output from the despreading/RAKE-combination section 109 based on the spreading code output from the spreading code determining section 107, and outputs the result to a decoder (not shown) to obtain received data. Here, the JD demodulation is an operation method described in, for example, Japanese Patent Application No. 2001-156625 and "EFFICIENT MULTI-RATE MULTI-USER DETECTION FOR THE ASYNCHRONOUS W-CDMA UPLINK", H. R. Karimi, IEEE VTC'99, p. 593-597. This JD demodulation is a technique that removes signals sent to other apparatuses from the signal received by the target apparatus, by using spreading codes, midambles, and the like used by the other apparatuses. In the present embodiment, the common midamble assigning scheme is used, therefore signals sent to other apparatuses are removed using a delay profile calculated from a common midamble among all users and spreading codes used by the other apparatuses.

Note that in case a plurality of spreading codes are assigned to one receiving apparatus, the DTX determining section 110 determines that it is transmission suspended period of DTX if none of the spreading codes assigned to this receiving apparatus exists among determination results output from the spreading code determining section 107.

As described above, according to the present embodiment, in the common midamble assigning scheme it is determined whether it is in a discontinuous receiving state by determining whether the spreading code used on the receiving side exists among the spreading codes contained in the received signal. When it is determined that it is in the discontinuous receiving state, the RAKE combination and JD demodulation are suspended, and thus power consumption of the receiving apparatus can be suppressed.

Moreover, the spreading code determining section 107 in the above configuration is an indispensable constituent when performing the JD demodulation in a communication system of the common midamble assigning scheme. Because of being able to divert the determination results of this circuit, the present embodiment can be easily realized without greatly changing the conventional circuit configuration.

EMBODIMENT 2

Figure 4:
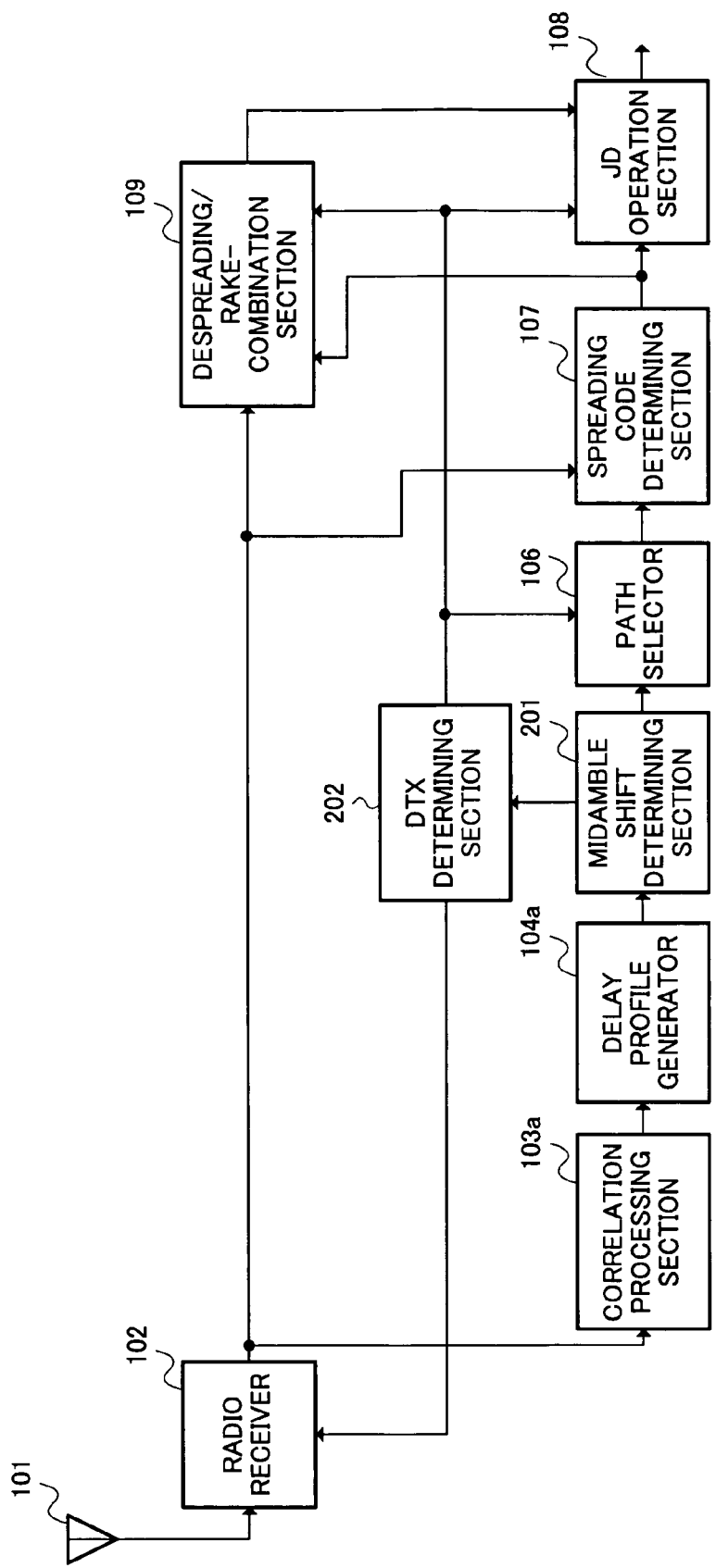
FIG. 4 is a block diagram showing an example of the configuration of a receiving apparatus according to embodiment 2 of the present invention.

FIG. 4 is a block diagram showing an example of the configuration of a receiving apparatus according to embodiment 2 of the present invention. Here, a case will be described as an example where the default midamble assigning scheme is used as the method of generating midambles. The receiving apparatus has the same basic configuration as the receiving apparatus shown in FIG. 3. The same constituents are indicated by the same reference numerals, and a description thereof is omitted.

A first feature of the present embodiment is that a midamble shift determining section 201 uses a different determining method than is used by the midamble shift determining section 105 shown in FIG. 3. Moreover, a second feature of the present embodiment is that a DTX determining section 202 having the same function as the DTX determining section 110 shown in FIG. 3 performs DTX determination based on the output of the midamble shift determining section 201.

In FIG. 4, a correlation processing section 103a performs a correlation calculation between the received signal output from the radio receiver 102 and midamble series known to the receiving side, and outputs the result to a delay profile generator 104a. The correlation calculation is performed not only with a midamble assigned to the apparatus but also with midambles assigned to the other apparatuses. All delay profiles generated based on the correlation calculation results are used in JD demodulation.

The delay profile generator 104a divides the correlation calculation results output from the correlation processing section 103a to generate the delay profile for each midamble shift. The delay profiles for the respective midamble shifts are output to the midamble shift determining section 201.

Figure 1A:
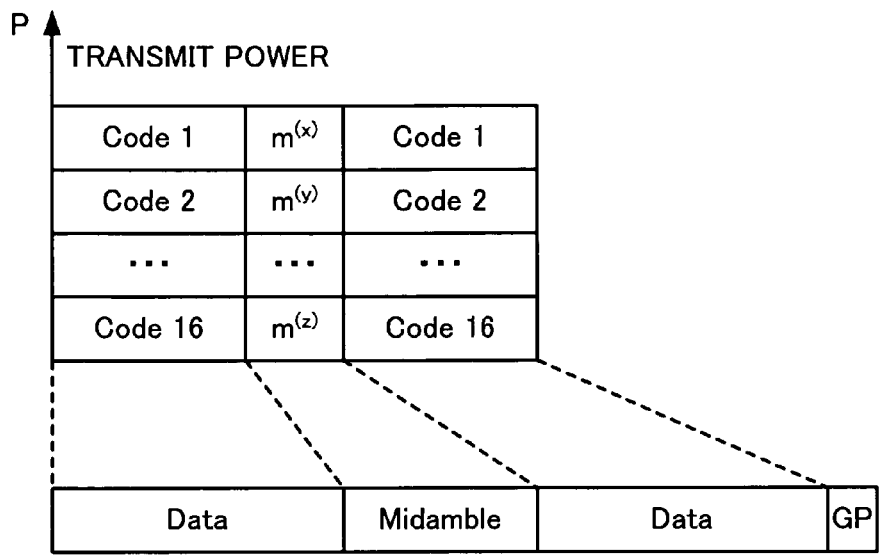
FIG. 1A is a view showing the structure of slots of a transmitted signal in a default midamble assigning scheme.
Figure 1B:
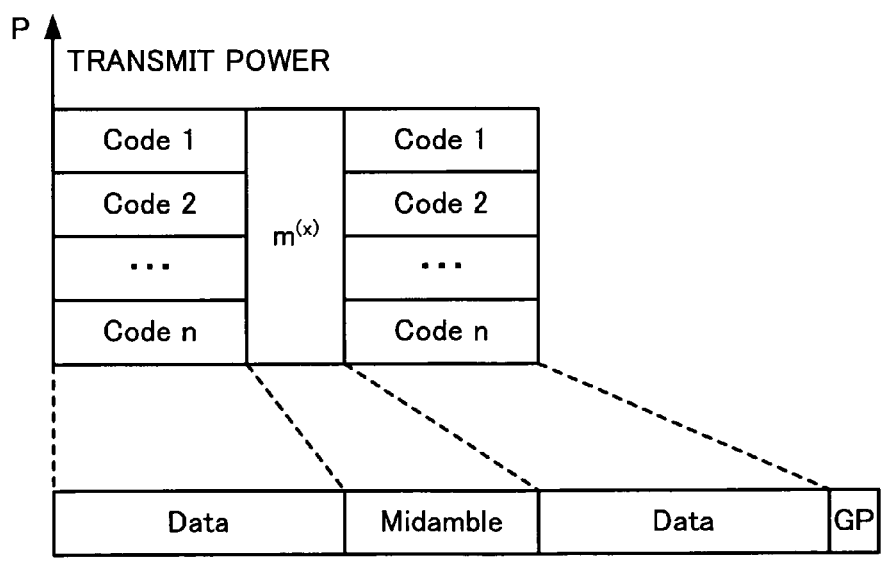
FIG. 1B is a view showing the structure of slots of a transmitted signal in a common midamble assigning scheme.
Figure 2:
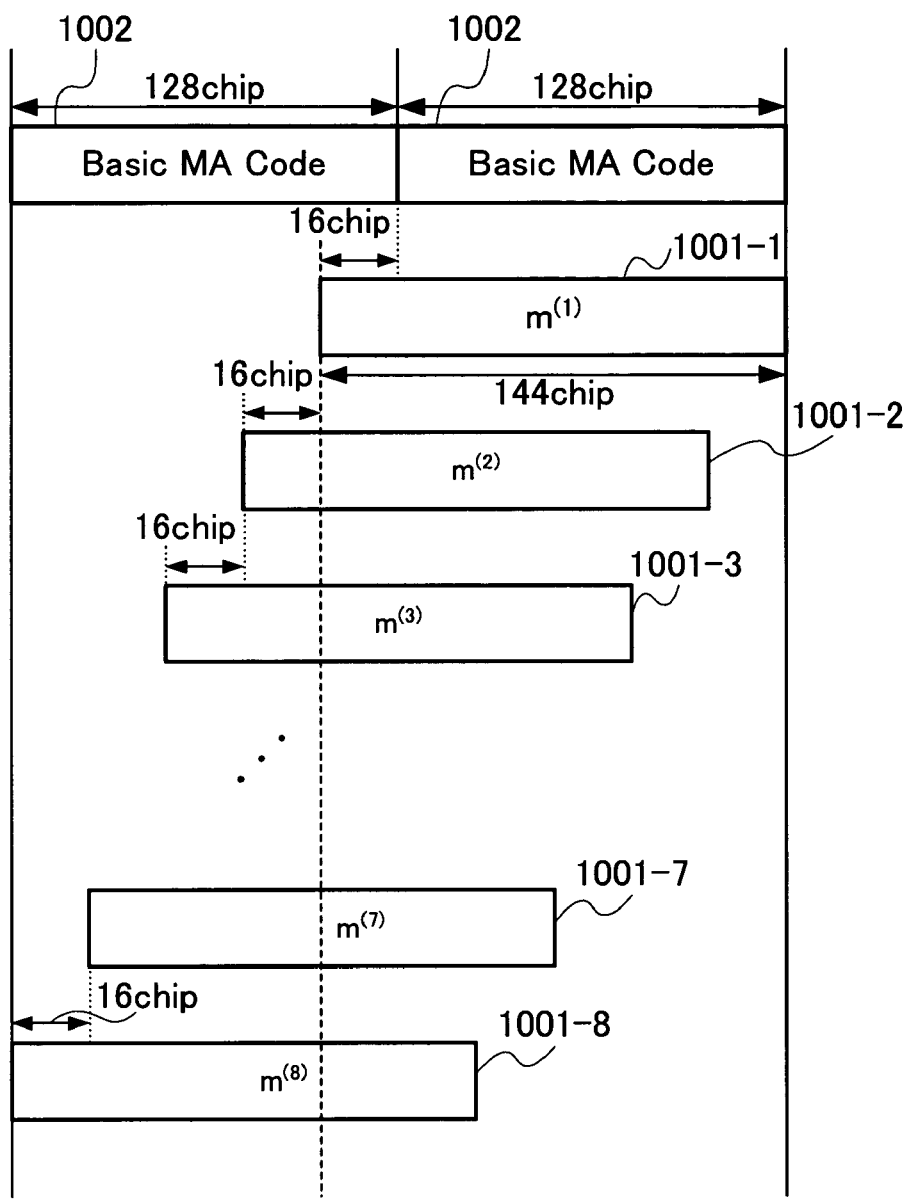
FIG. 2 is a view for explaining a method of generating midambles.

The midamble shift determining section 201 determines whether the corresponding midamble is actually being transmitted thereto based on the delay profiles output from the delay profile generator 104a. As shown in FIG. 2, midamble has eight variations from shift 1 to shift 8. Eight delay profiles corresponding thereto are generated in the delay profile generator 104a. The midamble shift determining section 201 determines whether the corresponding midamble shifts are actually being transmitted in multiplex, by performing determination with a threshold value on each of the maximum peak values of the delay profiles corresponding to the respective midambles.

Here, the threshold value is set at the larger one of a value obtained by subtracting $X_{MA}$ [dB] from the power value of the maximum peak in the delay profile corresponding to the midamble shift assigned to the apparatus and a value obtained by adding $Y_{MA}$ [dB] to a noise level in this delay profile. The average power of the rest of the signal obtained by removing the peak of path position used in the preceding frame from peaks present in the delay profile is used as the noise level.

When the received signal contains the midamble assigned to the apparatus, the peak intensities of the respective delay profiles corresponding to this midamble and the other midambles contained in the received signal are considered to be at the same level. Here, because the threshold value is set to the above-mentioned value, midamble shift determination is performed with the stricter reference compared with the case of using only the noise level as the reference. Thus, the determination accuracy can be improved.

The DTX determining section 202 determines that it is not a transmission suspended period of DTX when the midamble shift assigned to the apparatus exists among the determining results output from the midamble shift determining section 201, and determines that it is a transmission suspended period of DTX when the midamble shift assigned to the apparatus does not exist.

The later processing is the same as in the embodiment 1.

Note that, in case a plurality of midamble shifts are assigned to the receiving apparatus according to the present embodiment, the DTX determining section 202 determines that it is a transmission suspended period of DTX, when none of all the midamble shifts assigned to this apparatus exists among the determining results output from the midamble shift determining section 201.

As described above, according to the present embodiment, in the default midamble assigning scheme, the receiving apparatus determines whether it is in a discontinuous receiving state by determining whether the midamble assigned to this apparatus exists among the midambles contained in the received signal. When it is determined that it is in the discontinuous receiving state, the demodulation, RAKE combination, and JD demodulation are suspended, and thus power consumption of the receiving apparatus can be suppressed.

Moreover, the midamble shift determining section 201 in the above configuration is an indispensable constituent when performing the JD demodulation in a communication system of the default midamble assigning scheme. Because of being able to divert the determining results of this circuit, the present embodiment can be easily realized without greatly changing the conventional circuit configuration.

By combining the present embodiment with the embodiment 1, it can be implemented that the DTX determination methods are changed corresponding to the midamble assigning scheme.

The receiving apparatus according to the present invention can be provided for a communication terminal apparatus and a base station apparatus of the default midamble assigning scheme or the common midamble assigning scheme. Thus, a communication terminal apparatus and a base station apparatus that have the same effect as above can be provided.

As described above, according to the present invention, during DTX, the despreading, RAKE combination, and JD demodulation are suspended when it is determined that it is a transmission suspended period, and thus power consumption can be suppressed. Furthermore, the above performance can be achieved without greatly changing the conventional circuit configuration.

The present description is based on Japanese Patent Application No. 2002-148275 filed on May 22, 2002, which is herein incorporated by reference.

INDUSTRIAL APPLICABILITY

The present invention can be applied to a receiving apparatus of the CDMA scheme.

The invention claimed is:

1. A receiving apparatus comprising:
   a first determining section that determines whether known spreading codes or known midambles are contained in a received signal;
   a demodulation section that demodulates said received signal by using the known spreading codes or known midambles determined to be contained in said received signal;
   a second determining section that determines whether a spreading code or a midauible assigned to the receiving apparatus exists among the known spreading codes or known midambles determined to be contained in said received signal; and
   a suspending section that suspends part of processing to be performed in the receiving apparatus when said second determining section determines that the spreading code or midamble assigned to the receiving apparatus does not exist, wherein:
   said first determining section comprises:
      a midamble generator that generates all known midambles to be generated by cyclically shifting a basic midamble by a predetermined number of chips;
      a delay profile generator that generates delay profiles by performing a correlation calculation between said midambles and said received signal; and
      a comparing section that compares powers of maximum peaks of the generated delay profiles with a predetermined threshold value,
   when the power of the maximum peak of one of said delay profiles is not less than said predetermined threshold value, said comparing section determines that the midamble corresponding to this delay profile is a midamble contained in said received signal, and
   the predetermined threshold value used in said comparing section is a larger one of a value given by subtracting a predetermined quantity from power of a maximum peak of a delay profile corresponding to a midamble assigned to a channel for said receiving apparatus and a value given by adding a predetermined quantity to a noise level of said delay profile.

2. The receiving apparatus according to claim 1, wherein said part of the processing performed in the receiving apparatus comprises demodulation, RAKE receiving processing, and JD demodulation of said received signal.

3. The receiving apparatus according to claim 1, wherein said suspending section outputs a command to hold amplification gain at a preceding value in auto amplification gain control, when said second determining section determines that the spreading code or midamble assigned to the receiving apparatus does not exist.

4. A receiving method comprising:
   a first determining step of determining whether known spreading codes or known midambles are contained in a received signal;
   a demodulating step of demodulating said received signal by using the known spreading codes or the known midambles determined to be contained in said received signal;
   a second determining step of determining whether a spreading code or midamble assigned to a receiving apparatus exists among the known spreading codes or the known midambles determined to be contained in said received signal; and
   a suspending step of suspending part of processing to be performed in the receiving apparatus when it is determined in said second determination step that the spreading code or midauible assigned to the receiving apparatus does not exist, wherein:
   said first determining step comprises:
      a midamble generating step that generates all known midambles to be generated by cyclically shifting a basic midamble by a predetermined number of chips;
      a delay profile generating step that generates delay profiles by performing a correlation calculation between said midambles and said received signal; and
      a comparing step that compares powers of maximum peaks of the generated delay profiles with a predetermined threshold value,
   when the power of the maximum peak of one of said delay profiles is not less than said predetermined threshold value, said comparing step determines that the midamble corresponding to this delay profile is a midamble contained in said received signal, and
   the predetermined threshold value used in said comparing step is a larger one of a value given by subtracting a predetermined quantity from power of a maximum peak of a delay profile corresponding to a midamble assigned to a channel for the receiving apparatus and a value given by adding a predetermined quantity to a noise level of said delay profile.

* * * * *